US011028000B2

(12) United States Patent
Zhu et al.

(10) Patent No.: US 11,028,000 B2
(45) Date of Patent: Jun. 8, 2021

(54) METHOD FOR PREPARING ERIDITE ROD-SHAPED PARTICLES FOR WATER TREATMENT BY UTILIZING WASTEWATER

(71) Applicant: Northeast Normal University, Changchun (CN)

(72) Inventors: Suiyi Zhu, Changchun (CN); Ge Dong, Changchun (CN); Mingxin Huo, Changchun (CN); Zhan Qu, Changchun (CN); Dejun Bian, Changchun (CN)

(73) Assignee: NORTHEAST NORMAL UNIVERSITY, Changchun (CN)

( * ) Notice: Subject to any disclaimer, the term of this patent is extended or adjusted under 35 U.S.C. 154(b) by 90 days.

(21) Appl. No.: 16/392,269

(22) Filed: Apr. 23, 2019

(65) Prior Publication Data

US 2020/0140310 A1    May 7, 2020

(30) Foreign Application Priority Data

Nov. 7, 2018    (CN) .......................... 201811319060.4

(51) Int. Cl.
| | | |
|---|---|---|
| C02F 11/00 | (2006.01) | |
| C02F 11/127 | (2019.01) | |
| C02F 11/143 | (2019.01) | |
| C02F 1/72 | (2006.01) | |
| C02F 101/30 | (2006.01) | |

(52) U.S. Cl.
CPC ............ *C02F 11/127* (2013.01); *C02F 1/722* (2013.01); *C02F 1/725* (2013.01); *C02F 11/143* (2019.01); *C02F 2101/30* (2013.01); *C02F 2305/026* (2013.01)

(58) Field of Classification Search
CPC ........ C02F 11/127; C02F 11/143; C02F 9/00; C01G 49/12; C01G 49/009
See application file for complete search history.

(56) References Cited

U.S. PATENT DOCUMENTS 8,236,185 B2 * 8/2012 Lannicelli ................. B01J 20/06
210/800
2013/0200000 A1 * 8/2013 Lannicelli ............. C10G 25/003
210/663

OTHER PUBLICATIONS

Czamanske, G. K., B. F. Leonard, and J. R. Clark. "Erdite, a new hydrated sodium iron sulfide mineral." American Mineralogist 65.5-6 (1980): 509-515.
Konnert, J. A., and H. T. Evans. "The crystal structure of erdite, NaFeS 2. 2H 2 O." American Mineralogist 65.5-6 (1980): 516-521.
Honma, H. "Formation condition of erdite in system $FeCO_3$-NaHS solution at 150° C." Bull. Tokyo Gakugei Univ., Sect. 455 (2003): 39-44.
Li, Xiao-bin, et al. "Interaction of sulfur with iron compounds in sodium aluminate solutions." Transactions of Nonferrous Metals Society of China 25.2 (2015): 608-614.
Lassin, Amault, et al. "Estimated thermodynamic properties of NaFeS2 and erdite (NaFeS2: 2H2O)." Applied geochemistry45 (2014): 14-24.
Lassin, Amault, et al. "Reactivity of waste generated during lead recycling: an integrated study." Journal of hazardous materials 139.3 (2007): 430-437.
Gomes, Gabriel Meneghetti Faé, Talita Furlanetto Mendes, and Keiko Wada. "Reduction in toxicity and generation of slag in secondary lead process." Journal of Cleaner Production19.9-10 (2011): 1096-1103.
Tamura, I., N. Shikazono, and M. Nakata. "Experimental study of metasomatism from cerussite to galena at 150 C." Geochimica et Cosmochimica Acta Supplement 73 (2009): A1309.
Harraz, Farid A. "Polyethylene glycol-assisted hydrothermal growth of magnetite nanowires: Synthesis and magnetic properties." Physica E: Low-dimensional Systems and Nanostructures 40.10 (2008): 3131-3136.

* cited by examiner

*Primary Examiner* — Steven J Bos
(74) *Attorney, Agent, or Firm* — Hauptman Ham, LLP

(57) ABSTRACT

The present invention discloses a method for preparing Erdite rod-shaped particles for water treatment by utilizing iron-containing waste mud in an underground water plant. In the method, aqueous iron mud is subjected to mechanical dehydration to obtain a first aqueous iron mud; sodium sulfide is added to the first aqueous iron mud to obtain a first mixture, wherein the ratio of the weight of the first aqueous iron mud to the volume of sodium sulfide is between 3% and 15%; water of an equal volume is added to the first mixture, and the obtained solution is heated in an airtight manner to 140° C.-270° C.; centrifugal treatment is performed to obtain a supernatant and a solid, and the solid is subjected to vacuum drying at 40° C.-60° C. for 24 h to obtain Erdite rod-shaped particles. In the method, aqueous iron mud formed after precipitation of backwash wastewater is directly used, no drying treatment is needed, and silicon and aluminum and other impurities do not need to be removed, thereby saving costs; $Na_2S$ is directly added to iron mud which is subjected to mechanical dehydration, and adjustment of pH value is not needed, therefore, the preparation method is convenient; and a supernatant can be recycled, thereby lowering preparation cost, and expanding an application range of the method.

7 Claims, 4 Drawing Sheets

METHOD FOR PREPARING ERIDITE ROD-SHAPED PARTICLES FOR WATER TREATMENT BY UTILIZING WASTEWATER

TECHNICAL FIELD

The present invention relates to the technical field of environmental protection, in particular to a method for preparing Erdite rod-shaped particles for water treatment by utilizing iron-containing waste mud in an underground water plant.

BACKGROUND ART

As a waste generated from industrial production, iron-containing waste mud in an underground water plant is sludge formed after precipitation of backwash wastewater. In a medium-sized underground water plant, about 200 m$^3$ of aqueous iron mud is produced daily. Reported treatment methods include deep well reinjection, air storage and usage as an soil conditioner. According to requirements of environmental protection, in underground water plants, aqueous iron mud is usually transported to a wasteyard for landfilling after the aqueous iron mud is subjected to mechanical dehydration and safe curing.

Resource utilization of iron mud in an underground water plant mainly includes three aspects, (1) iron mud is utilized to produce red iron oxide; black iron oxide and $MnO_2$. (2) iron mud of a water plant is used as a raw material to prepare various magnetic absorbents, wherein magnetic substance include magnetic iron ore, maghemite and manganese ferrite. (3) iron mud is used as building materials. Heretofore no reports are available on the preparation of high-purity Erdite crystals ($NaFeS_2.2H_2O$) with iron mud in underground water plants as a raw material.

In the prior art, chemically pure iron carbonate is used as a raw material, NaHS solution is added, and after a reaction at 150° C. for 2-3 days, needle-shaped Erdite crystals are generated, while no effect is achieved with iron pyrite or magnetic iron ore as raw materials. Or $H_2S$ gas is introduced to a water solution mixed by iron oxide colloid and NaOH for several days, and Erdite crystals are prepared under heating conditions. By-products of Erdite are also found in industrial production. For example, in a high-temperature sintering process of high sulfur bauxite and coal, sodium sulfate is reduced to generate sodium sulfide, sodium sulfide reacts with iron to generate black solid particles containing $NaFeS_2$ and aluminum mineral, which transfers to aqueous alkali to generate Erdite in a weak crystalline state. In addition, some reports involve methods for preparing $NaFeS_2$, however, a crystal spectrum of $NaFeS_2$ particles is different from the spectrum of Erdite, proving that $NaFeS_2$ and Erdite are two different crystals. In some methods, chemically pure $Fe_2O_3$ and $Na_2S_2O_3$ powder are used to be mixed at a ratio of 1:2, and after being treated for 1 day at 200° C., $NaFeS_2$ powder is prepared. Erdite crystals can only be generated after prepared $NaFeS_2$ is treated in an alkaline solution. Such methods with chemical pure as a raw material to synthesize Erdite are time-consuming or long in flows, and are weak in degree of crystallinity of products. Moreover, such methods are generally only applicable to laboratory operations, and large-scale industrial production is still impossible.

Therefore, the prior art needs to be further improved and developed.

SUMMARY OF THE INVENTION

In view of the above shortcomings of the prior art, an objective of the present invention is to provide a method for preparing Erdite rod-shaped particles for water treatment by utilizing iron-containing waste mud in an underground water plant. In the method, aqueous iron mud formed after precipitation of backwash wastewater is directly used to prepare Erdite rod-shaped particles, thereby lowering preparation cost of Erdite rod-shaped particles.

To solve the above technical problem, the solutions of the present invention include:

A method for preparing Erdite rod-shaped particles for water treatment by utilizing iron-containing waste mud in an underground water plant is provided, said method including the following steps:

A. performing mechanical dehydration on aqueous iron mud, controlling a moisture content of the aqueous iron mud to be between 20% and 50%, to obtain a first aqueous iron mud;

B. adding sodium sulfide to the first aqueous iron mud to obtain a first mixture, wherein the ratio of the weight of the first aqueous iron mud to the volume of sodium sulfide is between 3% and 15%;

C. adding water of an equal volume to the first mixture, heating the obtained solution in an airtight manner to 140° C.-270° C., and keeping a constant temperature for 0.5 hr to 4 hr; and D. performing centrifugal treatment on the solution in step C to obtain a supernatant and a solid, and performing vacuum drying on the solid at 40° C.-60° C. for 24 hr to obtain Erdite rod-shaped particles, wherein a chemical formula of Erdite rod-shaped particles is $NaFeS_2.2H_2O$; and recycling the supernatant for standby applications.

Wherein the method further includes a step E: mixing the above supernatant with corresponding sodium sulfide to obtain a mixed liquor, wherein the ratio of the weight of supernatant to the volume of corresponding sodium sulfide is between 0.8% and 9.5%; mixing the same volume of said mixed liquor with the first aqueous iron mud obtained in step A, and then treating it according to step D; circularly treating in this way until Mn content in the supernatant is lower than 0.5 mg/L.

Wherein, the method includes: when Mn content in underground water treated by an underground water plant is lower than 0.5 mg/L, adding Mn at a dose of 0.5%-5% to a first aqueous iron mud obtained in step A, stirring uniformly after Mn is added, and then performing step C.

In the method, wherein step A further specifically includes: aqueous iron mud refers to aqueous iron mud which is generated after direct precipitation of backwash wastewater in an underground water plant, or refers to aqueous iron mud which is generated after precipitation of backwash wastewater in an underground water plant in which a coagulant is added.

In the method, wherein the above coagulant refers to inorganic coagulant containing iron, manganese, silicon and aluminium; and the dose of coagulant added to backwash wastewater should not exceed a concentration of 5 mg/L.

Wherein the method includes: adding Erdite rod-shaped particles obtained in step D to wastewater containing antibiotics tetracycline hydrochloride, adjusting pH to be smaller than 6, stirring for 1 h, letting the solution stand until particles are separated from water to remove tetracycline hydrochloride in the water.

Wherein the method includes: adding Erdite rod-shaped particles obtained in step D to organic wastewater, and adding persulphate, wherein the pH value of the wastewater does not need to be adjusted, stirring for 10 min, and letting the solution stand for 30 min to rapidly remove organic matters in the water.

The present invention provides a method for preparing Erdite rod-shaped particles for water treatment by utilizing iron-containing waste mud in an underground water plant. In the method, aqueous iron mud formed after precipitation of backwash wastewater is directly used, no drying treatment is needed, and silicon and aluminum and other impurities do not need to be removed, thereby saving costs; $Na_2S$ is directly added to iron mud which is subjected to mechanical dehydration, to prepare Erdite rod-shaped particles, and adjustment of pH value and stirring mixing are not needed, therefore, the preparation method is convenient; a supernatant can be recycled, thereby saving use amount of $Na_2S$, and lowering preparation cost; manganese is added to iron mud with a low content of manganese, thereby facilitating generation of Erdite rod-shaped particles, and expanding application range of the method; the prepared Erdite rod-shaped particles can be applied to a Fenton method to treat organic wastewater, pH value of wastewater does not need to be adjusted, and removal effect of organic matters is over 2 times that of a ferrite reagent, thereby being a great improvement of the prior art.

BRIEF DESCRIPTION OF THE DRAWINGS

FIG. 3 is a schematic diagram showing COD removal rate in treating organic wastewater by utilizing an Erdite particle Fenton method according to the present invention to;

DETAILED DESCRIPTION OF THE EMBODIMENTS

Figure 1A:
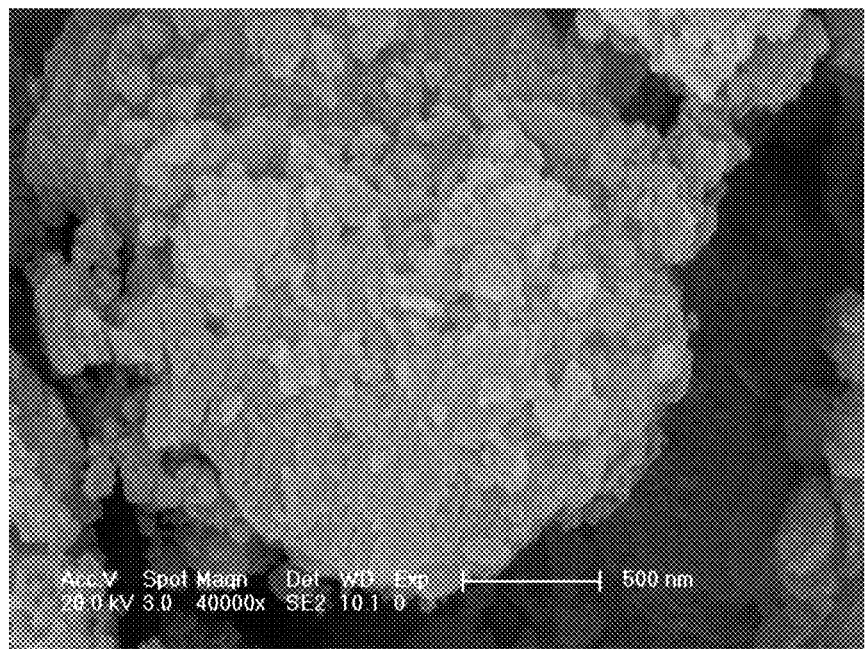
FIG. 1A is scanning electron microscope diagram of iron mud (with a high content of manganese) in an underground water plant according to the present invention.

The present invention provides a method for preparing Erdite rod-shaped particles for water treatment by utilizing iron-containing waste mud in an underground water plant. In order that objectives, technical solutions and effects of the present invention are clearer and specific, a further detailed description will be given below on the present invention. It should be noted that, specific embodiments described herein are merely used for explaining the present invention, rather than for limiting the present invention.

The present invention provides a method for preparing Erdite rod-shaped particles for water treatment by utilizing iron-containing waste mud in an underground water plant, including the following steps:

A. performing mechanical dehydration on aqueous iron mud, controlling a moisture content of the aqueous iron mud to be between 20% and 50%, to obtain a first aqueous iron mud;

B. adding sodium sulfide to the first aqueous iron mud to obtain a first mixture, wherein the ratio of the weight of the first aqueous iron mud to the volume of sodium sulfide is between 3% and 15%;

C. adding water of an equal volume to the first mixture, heating the obtained solution in an airtight manner to 140° C.¹-270° C., and keeping a constant temperature for 0.5 hr to 4 hr; and D. performing centrifugal treatment on the solution in step C to obtain a supernatant and a solid, and performing vacuum drying on the solid at 40° C.-60° C. for 24 hr to obtain Erdite rod-shaped particles, wherein a chemical formula of Erdite rod-shaped particles is $NaFeS_2 \cdot 2H_2O$; and recycling the supernatant for standby applications.

Another preferred embodiment of the present invention further includes a step E: mixing the above supernatant with corresponding sodium sulfide to obtain a mixed liquor, wherein the ratio of the weight of supernatant to the volume of corresponding sodium sulfide is between 0.8% and 9.5%; mixing the same volume of said mixed liquor with the first aqueous iron mud obtained in step A, then treating it according to operations in step D, performing centrifugal treatment on the mixed liquor to obtain a supernatant and a solid, and performing vacuum drying on the solid at 40° C.-60° C. for 24 hr to obtain Erdite rod-shaped particles, recycling the supernatant for standby applications; circularly treating in this way until Mn content in the supernatant is lower than 0.5 mg/L.

Moreover, when Mn content in underground water treated in an underground water plant is lower than 0.5 mg/L, Mn at a dose of 0.5%-5% is added to a first aqueous iron mud obtained in step A, after Mn is added, the obtained mixture is stirred uniformly, and then treat it according to steps B, C and D in sequence.

Further, step A further specifically includes: aqueous iron mud refers to aqueous iron mud which is generated after direct precipitation of backwash wastewater in an underground water plant, or refers to aqueous iron mud which is generated after precipitation of backwash wastewater in an underground water plant in which a coagulant is added.

Moreover, the above coagulant refers to inorganic coagulant containing iron, manganese, silicon and aluminium; and the dose of coagulant added to backwash wastewater should not exceed a concentration of 5 mg/L.

Especially, Erdite rod-shaped particles obtained in step D are added to wastewater containing antibiotics tetracycline hydrochloride, the pH is adjusted to be lower than 6, the mixture is stirred for 1 hr and stood until particles are separated from water to remove tetracycline hydrochloride in the water. Or, Erdite rod-shaped particles obtained in step D are added to organic wastewater, persulphate is added, the pH value of wastewater does not need to be adjusted, and the mixture is stirred for 10 min and stood for 30 min to rapidly remove organic matters in the water.

In order to give a further description of the present invention, more detailed embodiments will be enumerated below for illustration.

Step 1: Selection of Iron Mud of an Underground Water Plant

1000 L of aqueous iron mud after backwash wastewater was precipitated was taken, after the aqueous iron mud was treated with a plate-frame filter press, iron mud at a moisture content of 42.2% was obtained. In the iron mud, the content of iron was 20.23 wt. %, and the content of manganese was 1.84 wt. %. The morphology of iron mud was as shown in FIG. 1A, and major impurities in the iron mud were Si, Al, P and Ca, with content being 2.38 wt. %, 1.15 wt. %, 0.89 wt. % and 0.64 wt. % respectively.

Step 2: Mixing of Iron Mud and Sodium Sulfide

1 L of dehydrated iron mud in step 1 was taken, 50 g of sodium sulfide (at a purity of 74%) was added, and then 1 L of underground water was added.

Step 3: Treatment of Iron Mud

Figure 1B:
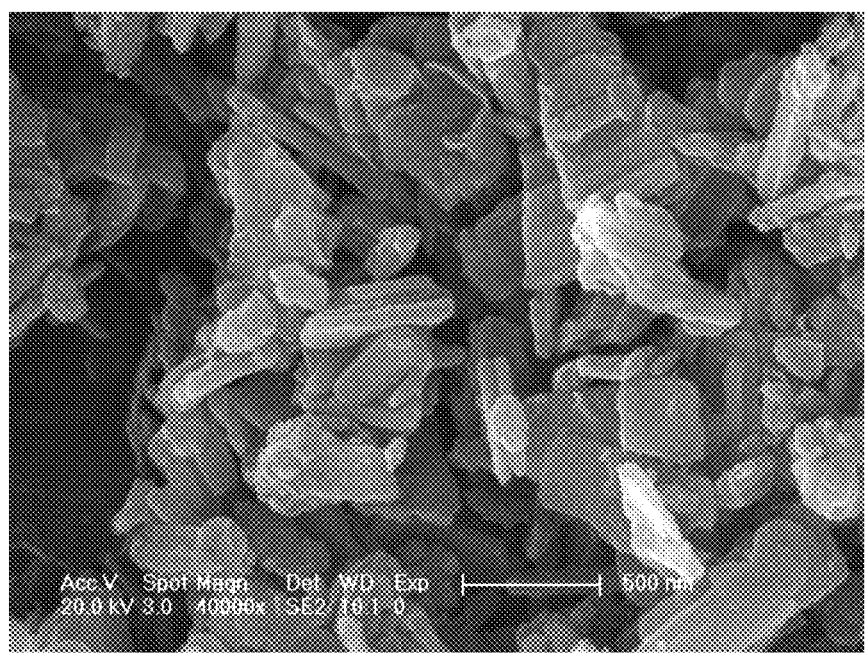
FIG. 1B is scanning electron microscope diagram of a sample prepared with sodium sulfide at the amount of 50 g being added into the iron mud in FIG. 1A according to the present invention.

A mixed liquor of iron mud, sodium sulfide and water in step 2 was placed in an airtight container of 3 L. The mixed liquor was rapidly heated to 160° C. and the temperature was kept constant for 1 hr. Black precipitates at the bottom were collected, and were subjected to vacuum drying at 50° C. for 24 h to obtain tablet particles as shown in FIG. 1B.

Step 4: Adjustment of Amount of Added Sodium Sulfide

Figure 1C:
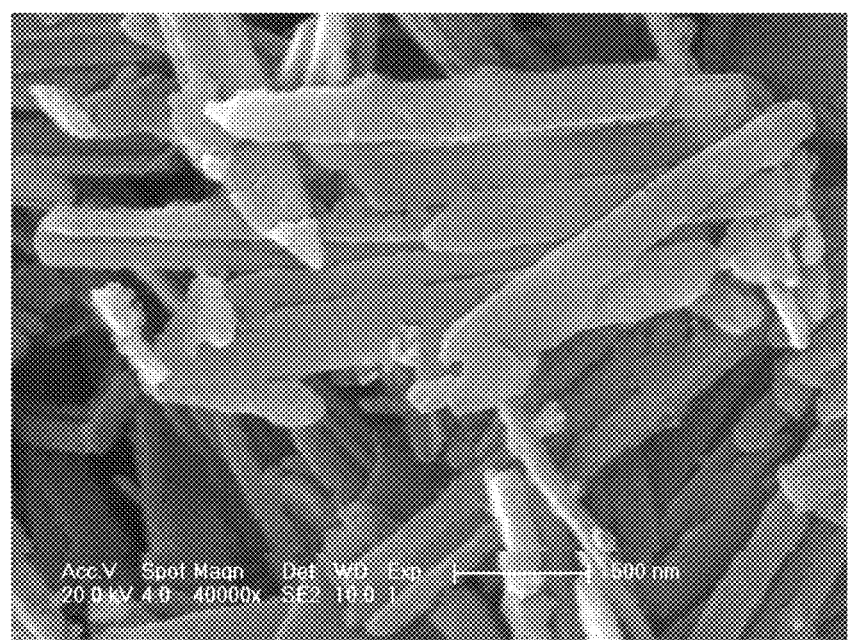
FIG. 1C is scanning electron microscope diagram of a sample prepared with sodium sulfide at the amount of 120 g being added into the iron mud in FIG. 1A according to the present invention.

The amount of added sodium sulfide in step 2 was increased to 120 g, and rod-shaped particles were obtained after a treatment according to step 3, as shown in FIG. 1C.

Step 5: Recycling of Supernatant 1.2 L of supernatant obtained after a reaction in step 4 was recovered, wherein the concentration of $S^{2-}$ was 17.8 g/L. 1 L of supernatant was taken, and was mixed with 1 L of dehydrated iron mud after 75 g sodium sulfide was added, an airtight heating reaction was performed according to requirements in step 3 to obtain Erdite rod-shaped particles, wherein the morphology of Erdite rod-shaped particles was the same as that of the products prepared in step 4.

Step 6: Adsorption Effect of Erdite Rod-Shaped Particles

Figure 2:
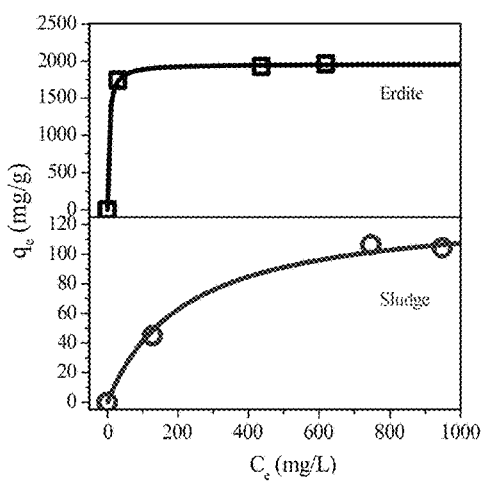
FIG. 2 shows adsorption amounts of iron mud in an underground water plant and Erdite particles prepared by utilizing iron mud in an underground water plant to tetracycline hydrochloride in the water according to the present invention.

Erdite rod-shaped particles and dry iron mud at equal amounts were taken and placed in a water solution containing tetracycline hydrochloride, the mixture was stirred at a speed of 120 rpm continuously for 2 h, wherein as to the adsorption amount of tetracycline hydrochloride in the water on Erdite particles and iron mud, please refer to FIG. 2. The adsorption amount of synthesized Erdite particles on tetracycline hydrochloride is 20 times that of the adsorption amount of iron mud.

Figure 3:
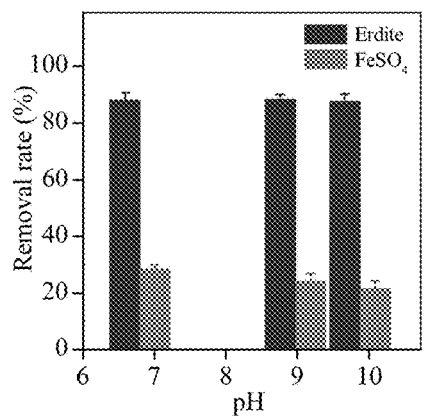

Step 7: Application of Erdite Rod-Shaped Particles in a Fenton Method to Remove Organic Matters in the Water Wastewater at an initial COD concentration of 460 mg/L was taken to prepare 1 part of original wastewater with pH value being not adjusted and 2 parts of wastewater with pH being adjusted to 9 and 10 respectively was taken; Erdite rod-shaped particles and ferrous sulfate at an equal amount were added to the wastewater with different pH values, and sodium persulfate of the same amount was added; the obtained mixture was stirred at a speed of 260 rpm for 30 min and was stood for 1 h. The efficiency of removing organic matters in wastewater was as shown in FIG. 3. The removal rate of organic matters in a Fenton system added with Erdite rod-shaped particles was 2.7 times the removal rate of organic matters in a Fenton system added with the same amount of ferrous sulfate.

Step 8: Selection of Iron Mud with a Low Content of Manganese

Figure 4A:
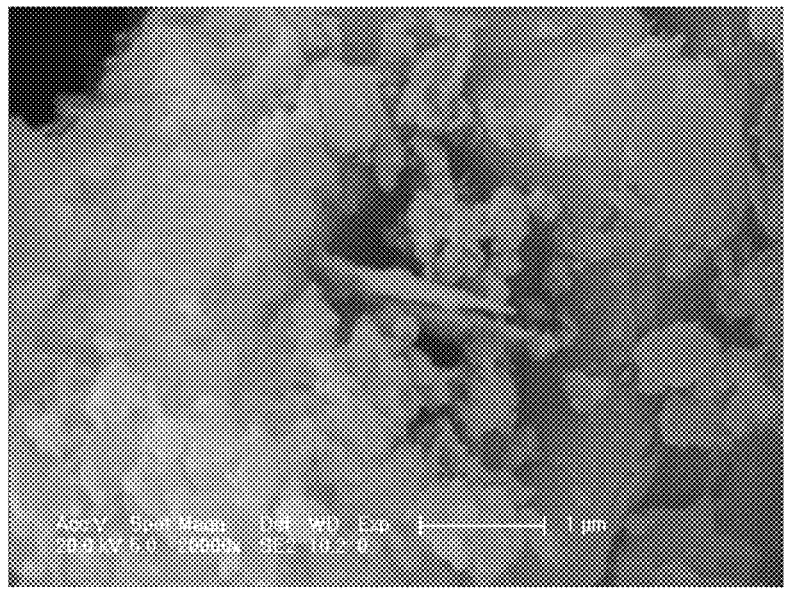
FIG. 4A is scanning electron microscope diagram of iron mud (with a low content of manganese) in an underground water plant according to the present invention.
Figure 5:
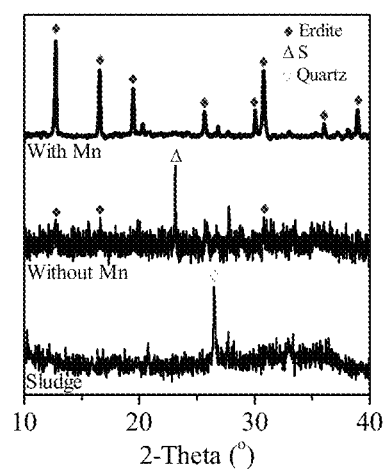
FIG. 5 is an X-ray diffraction spectrogram of iron mud (with a low content of manganese) in an underground water plant, a sample with no $MnO_2$ powder being added and a sample prepared with 2.2% of $MnO_2$ powder being added according to the present invention.

The concentration of iron in a source water in an underground water plant was detected to be 9.2 mg/L, while the concentration of manganese was 0.2 mg/L. Aqueous iron mud after backwash wastewater was precipitated was collected, and after dehydration through plate-frame pressure filtration, the moisture content was 38.5%, wherein the content of iron was 26.1 wt. %, and the content of manganese was 0.02 wt. %. The morphology of iron mud with a low content of manganese was as shown in FIG. 4A, wherein silicon dioxide with a high degree of crystallinity and iron and manganese oxides with a weak degree of crystallinity are contained (FIG. 5).

Step 9: Treatment of Iron Mud with a Low Content of Manganese

Figure 4B:
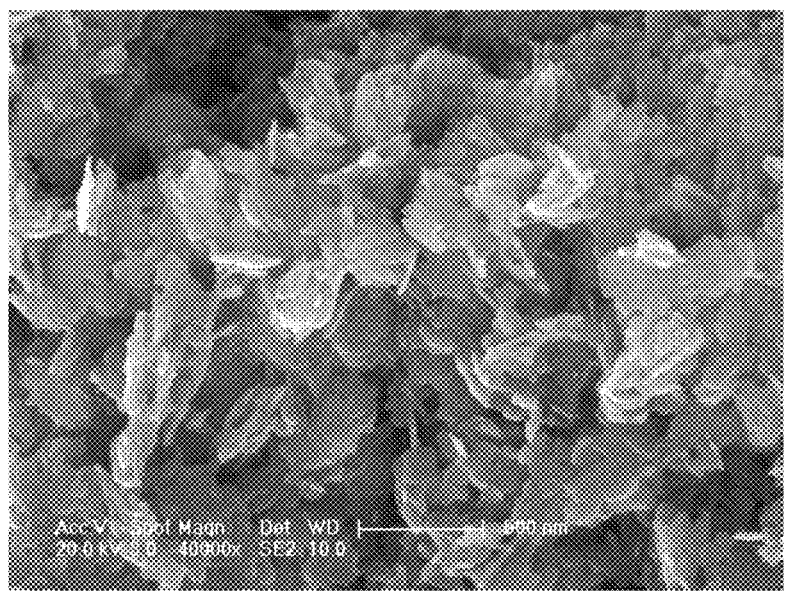
FIG. 4B is scanning electron microscope diagram of a sample with no $MnO_2$ powder being added according to the present invention.

Dehydrated iron mud containing a low content of manganese was taken and treated according to step 4 to obtain tablet products, as shown in FIG. 4B. As to the crystal features of the products, please refer to FIG. 5, wherein a simple substance S with a high degree of crystallinity and Erdite crystals at a low degree of crystallinity were included.

Figure 4C:
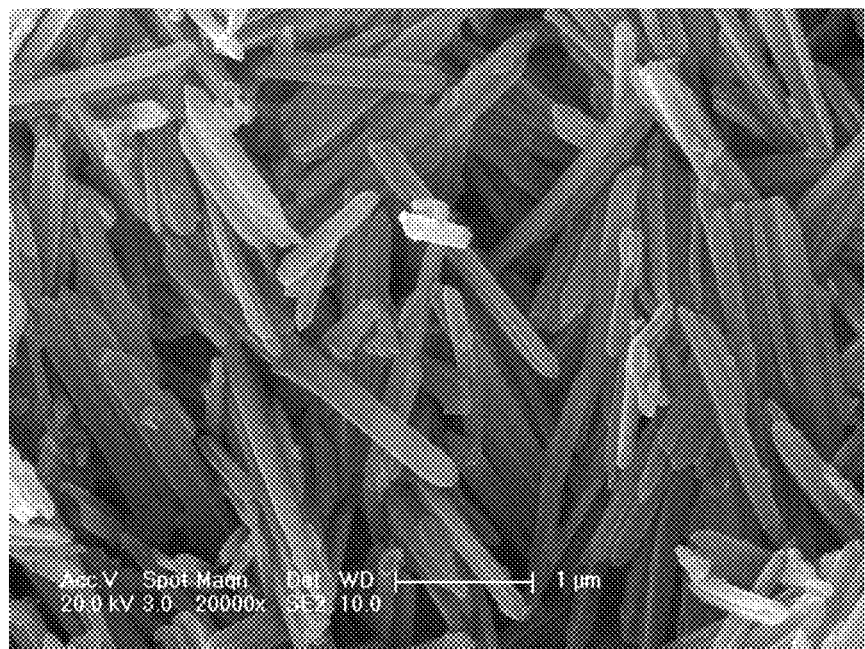
FIG. 4C is scanning electron microscope diagram of a sample prepared with 2.2% of $MnO_2$ powder being added according to the present invention.

Step 10: Preparation of Erdite Rod-Shaped Particles from Iron Mud with a Low Content of Manganese Dehydrated iron mud containing a low content of manganese was taken, 2.2% $MnO_2$ powder was added to the iron mud, after the obtained mixture was treated according to step 4, rod-shaped particle products were generated, as shown in FIG. 4C. For crystal features of products, please refer to FIG. 5, and Erdite crystals at a high degree of crystallinity were found.

In the present invention, aqueous iron mud is subjected to mechanical dehydration, and is heated in an airtight manner after being mixed with sodium sulfide, to obtain Erdite rod-shaped particles. For iron mud with a low content of manganese, Mn can be added to dramatically improve degree of crystallinity of Erdite particles. Prepared Erdite particles have a favorable adsorption effect on tetracycline hydrochloride in the water, and can be applied to a Fenton method to treat organic wastewater. In the present invention, the method for preparing Erdite particles by utilizing iron mud in an underground water plant is convenient in process, low in cost and wide in application range.

Of course, the above descriptions are merely preferred embodiments of the present invention, and the present invention is not limited to enumerating the above embodiments. It should be noted that, all the equivalent substitutions and obvious deformations made by those skilled in the art under the teaching of the present description shall all fall within an essential scope of the present invention and should be protected by the present invention.

The invention claimed is:

1. A method for preparing Erdite rod-shaped particles for water treatment by utilizing iron-containing waste mud in an underground water plant, said method comprising the following steps:
   A. performing mechanical dehydration on aqueous iron mud, controlling a moisture content of the aqueous iron mud to be between 20% and 50%, to obtain a first aqueous iron mud;
   B. adding sodium sulfide to the first aqueous iron mud to obtain a first mixture, wherein a weight of the first aqueous iron mud to a volume of sodium sulfide is between 3% and 15%;
   C. adding to the first mixture a volume of water equal to a volume of the first mixture, airtight heating the first mixture with the added water at a constant temperature of 140° C.-270° C. for 0.5 hr to 4 hr; and D. centrifuging the solution from step C to obtain a supernatant and a solid, and vacuum drying the solid at 40° C.-60° C. for 24 hr to obtain Erdite rod-shaped particles, wherein the Erdite is $NaFeS_2 \cdot 2H_2O$; and recycling the supernatant for standby applications.

2. The method of claim 1, further comprising a step E: mixing the supernatant with corresponding sodium sulfide to obtain a mixed liquor, wherein the weight of the supernatant to the volume of the sodium sulfide is between 0.8% and 9.5%; mixing a same volume of the mixed liquor with a same volume of the first aqueous iron mud obtained in step A, and then proceeding according to step D; circularly proceeding until a Mn content in the supernatant is lower than 0.5 mg/L.

3. The method of claim 2, wherein when the Mn content in underground water treated by the underground water plant is lower than 0.5 mg/L, adding Mn at a concentration of 0.5%-5% to the first aqueous iron mud obtained in step A, stirring uniformly after Mn is added, and then performing step C.

4. The method of claim 1, wherein step A further specifically comprises: aqueous iron mud is aqueous iron mud which is generated after direct precipitation of backwash wastewater in the underground water plant, or is aqueous iron mud which is generated after precipitation of the backwash wastewater in the underground water plant in which a coagulant is added.

5. The method of claim 4, wherein the coagulant is inorganic coagulant containing iron, manganese, silicon and aluminium; and the dose of the coagulant added to the backwash wastewater should not exceed a concentration of 5 mg/L.

6. The method of claim 1, comprising: adding Erdite rod-shaped particles obtained in step D to wastewater containing tetracycline hydrochloride, adjusting pH to be less than 6, stirring for 1 hr, letting stand until particles are separated from water to remove tetracycline hydrochloride in water.

7. The method of claim 1, comprising: adding Erdite rod-shaped particles obtained in step D to organic wastewater, and adding persulphate, wherein a pH value of the wastewater need not to be adjusted, stirring for 10 min, and letting stand for 30 min to rapidly remove organic matter in water.

* * * * *